(No Model.)
C. F. STONE.
MEANS FOR HOLDING DIES.
No. 338,202. Patented Mar. 16, 1886.
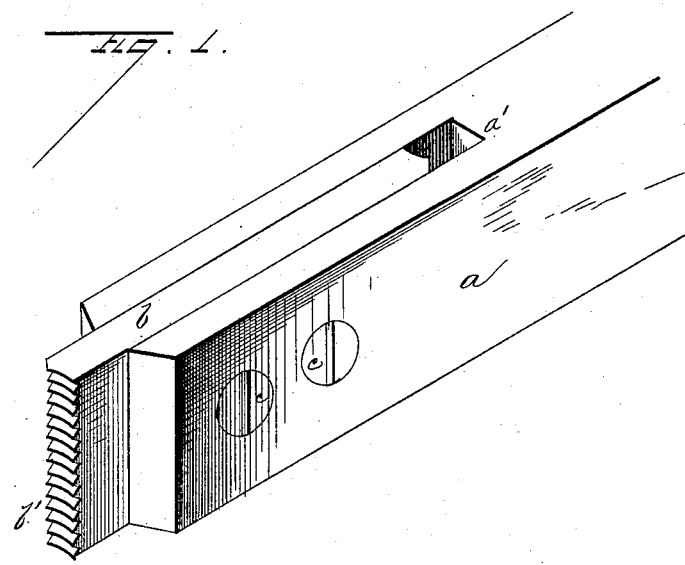
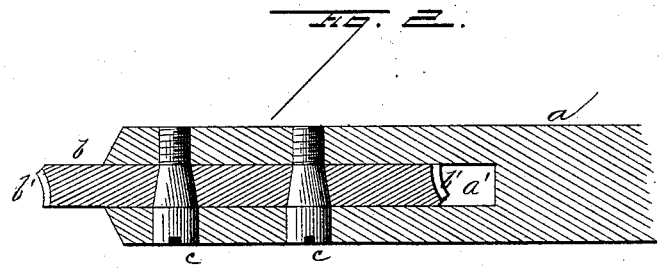
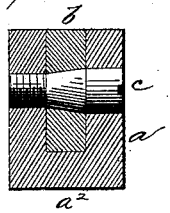
Witnesses:
H. C. McArthur
Frank Stratton
Inventor.
Charles F. Stone
per.
H. Harrison
Attorney.

UNITED STATES PATENT OFFICE.

CHARLES F. STONE, OF CHICAGO, ILLINOIS.

MEANS FOR HOLDING DIES.

SPECIFICATION forming part of Letters Patent No. 338,202, dated March 16, 1886.

Application filed July 25, 1885. Serial No. 172,601. (No model.)

*To all whom it may concern:*

Be it known that I, CHARLES F. STONE, a citizen of the United States, residing at Chicago, in the county of Cook and State of Illinois, have invented certain new and useful Improvements in Means for Holding Dies, of which the following is a specification, to wit:

This invention relates to an improvement in means for holding dies; and it consists in the peculiar construction and arrangement of the same, substantially as will be hereinafter more fully set forth and claimed.

In order to enable others skilled in the art to which my invention appertains to make and use the same, I will now proceed to describe its construction and arrangement, referring to the accompanying drawings, in which—

Figure 1 is a perspective view of a die and holder. Fig. 2 is a longitudinal section of the same, and Fig. 3 a cross-section.

$a$ represents a die-holder of the usual or any desired form, having the usual slot, $a'$, for the reception of the die $b$.

It has been usual to construct the dies as herein shown, and in the process of manufacture the die was first secured in the holder by screws or otherwise, and the two planed or worked off to correspond, and the thread-cutting teeth $b'$ formed on the die. It was then removed from the holder to temper and finish it, and in replacing trouble was found in getting it set in the precise position before occupied, and which it must resume to perform its work perfectly. It was found in using two or more of them in cutting the threads upon bolts and similar work that they did not all act in unison, and the result was a broken or ragged thread on the bolt. I obviate this by making it possible to always return the die to exactly the same position first occupied by it in the holder, as follows: The die $b$ is secured in the holder by one or more tapering screws, $c\ c$, as seen fully in Figs. 2 and 3. The die, having been placed in the holder and secured by these screws passed through it, is then cut, and after being tempered is readily returned to its exact position, the conical or tapering screws centering it and drawing it firmly to place as they are inserted. The die is thus free to be removed and inserted at will with perfect accuracy.

In Figs. 1 and 2 I have shown the die as held in place by two of these screws, and in Fig. 3 I have represented the holder formed with a back, $a^2$, against which the die lies to prevent its twisting, and a single conical screw for centering and drawing it to place.

While I have herein represented a screw-cutting die only, it is evident that milling and other dies may be secured and centered in the same manner with equally good results.

The taper of the screw must pass entirely through the die to be effective. By making the screws with parallel ends and tapering portions passing through the die, the die is centered and the sides of the holder not clamped.

Having thus fully described my invention, what I claim as new, and desire to secure by Letters Patent, is—

1. A securing-screw for dies, formed with straight ends and a tapering center, substantially as shown and described, and for the purpose set forth.

2. The combination, with a die and its holder, of a securing-screw having straight portions passing through the holder and a tapering portion passing through the die, substantially as described and shown, and for the purpose set forth.

In testimony whereof I affix my signature in presence of two witnesses.

CHARLES F. STONE.

Witnesses:
W. C. MCARTHUR,
FRANK STRATTON.